(12) United States Patent
Pionetti

(10) Patent No.: US 9,518,682 B2
(45) Date of Patent: Dec. 13, 2016

(54) MULTIPLE FLEXIBLE SEAFLOOR-SURFACE LINKING APPARATUS COMPRISING AT LEAST TWO LEVELS

(71) Applicant: François Régis Pionetti, La Baleine (FR)

(72) Inventor: François Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 0 days.

(21) Appl. No.: 14/361,635

(22) PCT Filed: Nov. 23, 2012

(86) PCT No.: PCT/FR2012/052717
§ 371 (c)(1),
(2) Date: May 29, 2014

(87) PCT Pub. No.: WO2013/079857
PCT Pub. Date: Jun. 6, 2013

(65) Prior Publication Data
US 2014/0338919 A1 Nov. 20, 2014

(30) Foreign Application Priority Data
Nov. 30, 2011 (FR) .................................. 11 60934

(51) Int. Cl.
*E21B 17/01* (2006.01)
*F16L 3/01* (2006.01)

(52) U.S. Cl.
CPC ................ *F16L 3/01* (2013.01); *E21B 17/015* (2013.01)

(58) Field of Classification Search
CPC .......... E21B 17/015; E21B 17/017; F16L 1/20
(Continued)

(56) References Cited

U.S. PATENT DOCUMENTS 4,301,840 A * 11/1981 Jansen ............................. 141/98
4,793,737 A * 12/1988 Shotbolt ....................... 405/169
(Continued)

FOREIGN PATENT DOCUMENTS

| EP | 0 251 488 | 1/1988 |
|----|-----------|--------|
| WO | WO 00/31372 | 6/2000 |
| WO | WO 2011/061422 | 5/2011 |

*Primary Examiner* — Matthew R Buck
*Assistant Examiner* — Aaron Lembo
(74) *Attorney, Agent, or Firm* — Cozen O'Connor

(57) ABSTRACT

A bottom-to-surface connection installation between a common floating support and the sea bottom, having a plurality of flexible lines such as flexible pipes extending between said floating support and the sea bottom. The flexible lines are supported by respective ones of a plurality of troughs each trough lying between two pipe portions defining a first flexible line portion in a hanging double catenary configuration between the floating support and the trough, and a second flexible line portion in a single catenary configuration between the trough and the point of contact of the flexible pipe with the sea bottom. The installation has at least one support structure having a base-forming bottom portion resting on and/or anchored to, or embedded in the sea bottom and a top portion supporting at least two troughs, respectively a bottom trough and a top trough, the troughs being arranged at different heights in such a manner that the low point of the first flexible line portion passing via the bottom trough is situated below the low point of the first flexible line portion passing via the top trough.

21 Claims, 8 Drawing Sheets

(58) Field of Classification Search
USPC ............................... 166/352, 367; 405/224.2
See application file for complete search history.

(56) References Cited

U.S. PATENT DOCUMENTS

| | | | |
|---|---|---|---|
| 5,427,046 A * | 6/1995 | Brown et al. | 114/230.13 |
| 5,437,518 A * | 8/1995 | Maloberti et al. | 405/169 |
| 5,447,114 A * | 9/1995 | Korsgaard | 114/230.13 |
| 5,505,560 A * | 4/1996 | Brown et al. | 405/195.1 |
| 6,109,833 A * | 8/2000 | Savy | 405/195.1 |
| 6,206,742 B1 * | 3/2001 | Bull et al. | 441/1 |
| 6,213,215 B1 * | 4/2001 | Breivik et al. | 166/350 |
| 6,276,874 B1 * | 8/2001 | Nørholmen et al. | 405/168.1 |
| 6,415,828 B1 * | 7/2002 | Duggal et al. | 141/387 |
| 6,558,215 B1 * | 5/2003 | Boatman | 441/5 |
| 7,025,533 B1 * | 4/2006 | Mungall et al. | 405/158 |
| 7,040,841 B2 * | 5/2006 | Kelm et al. | 405/224.2 |
| 7,287,936 B2 * | 10/2007 | Streiff et al. | 405/224.2 |
| 7,434,624 B2 * | 10/2008 | Wilson | 166/368 |
| 7,591,316 B2 * | 9/2009 | Hatton | 166/355 |
| 2005/0158126 A1 * | 7/2005 | Luppi | 405/224.2 |
| 2011/0155383 A1 * | 6/2011 | Christiansen et al. | 166/345 |

* cited by examiner

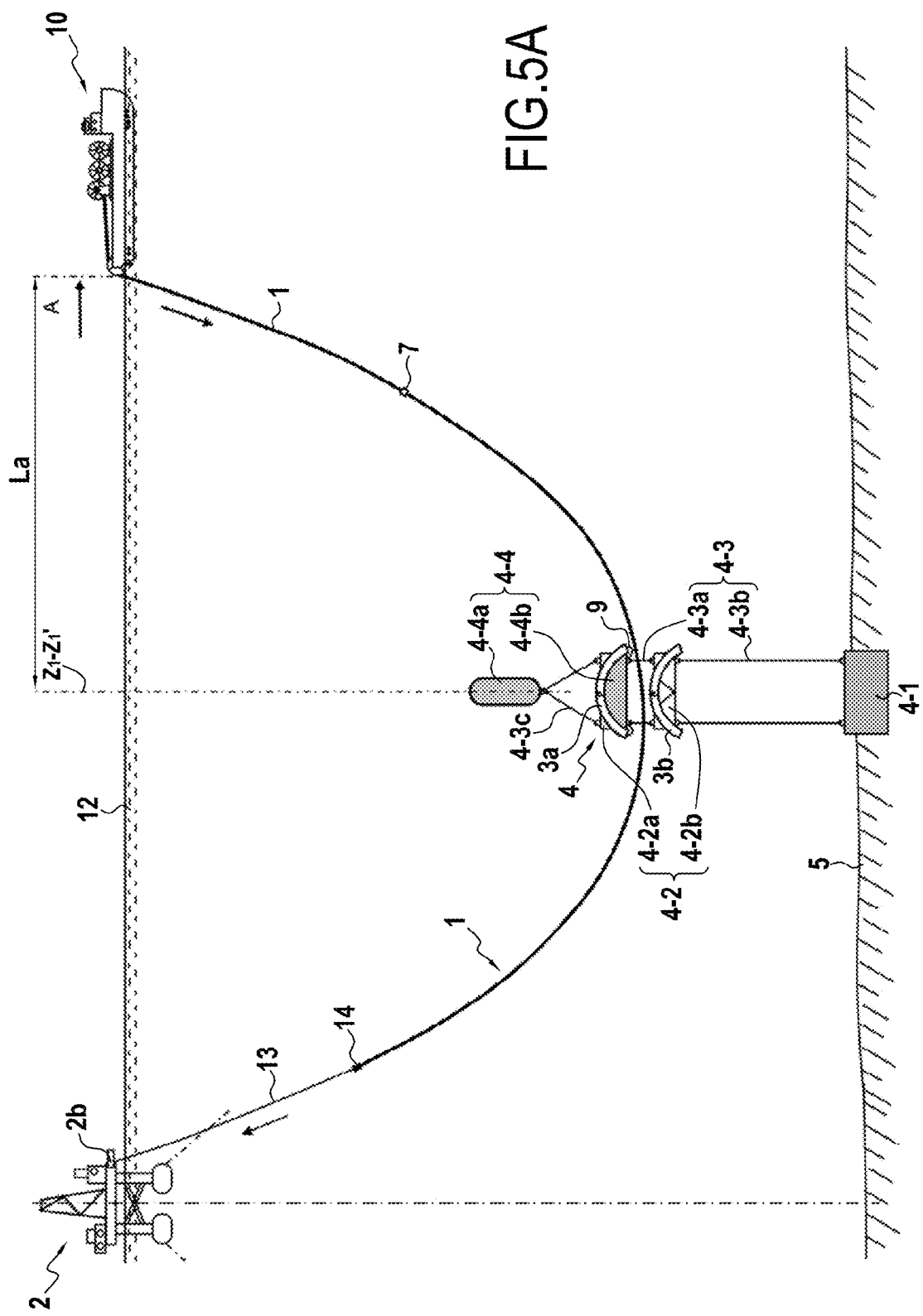

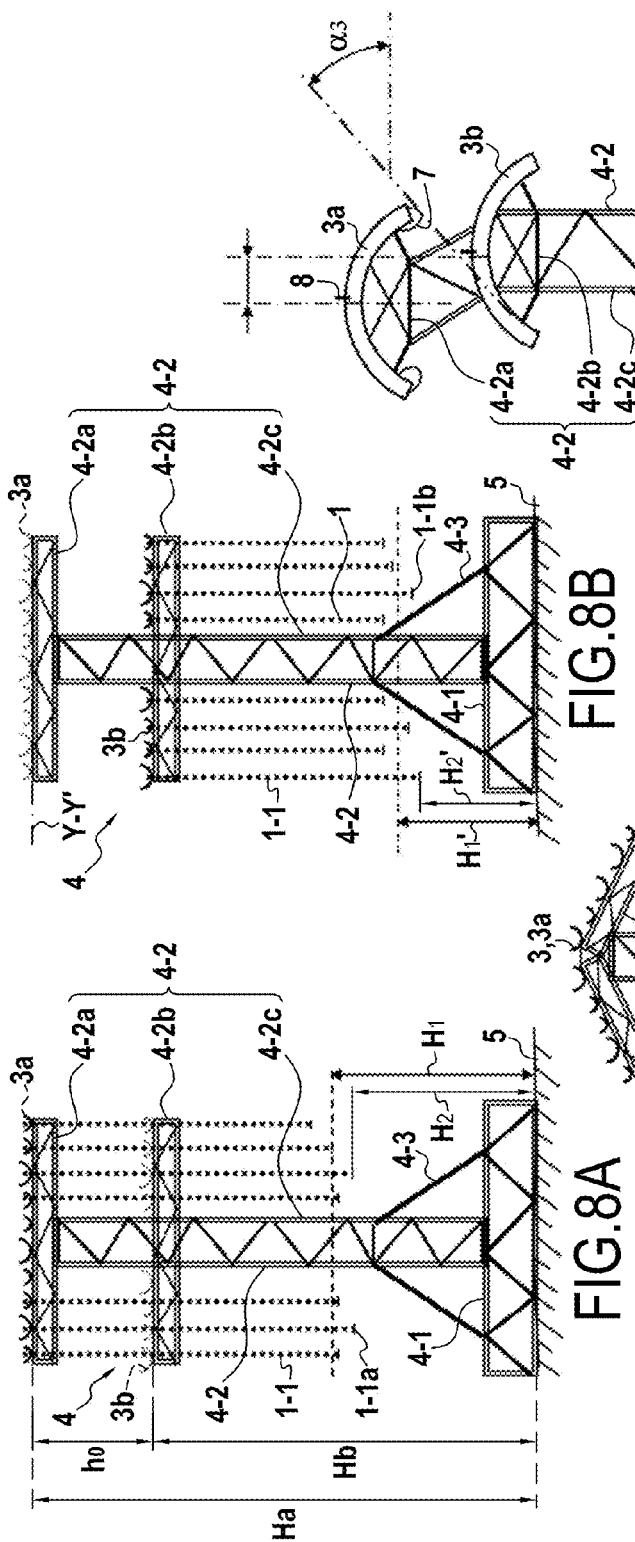
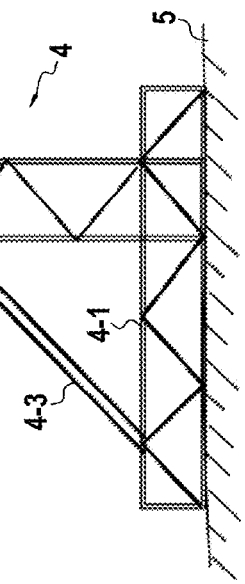
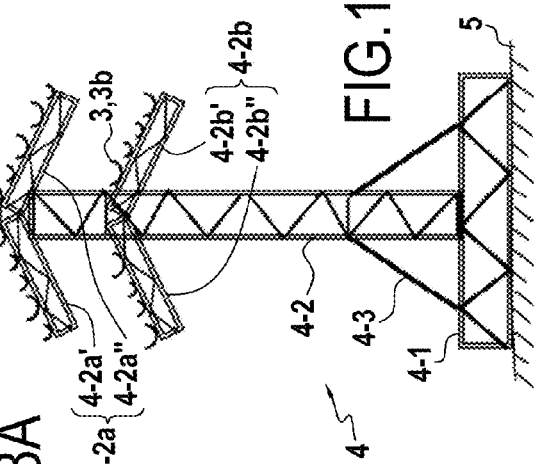
FIG. 8A  FIG. 8B  FIG. 9  FIG. 10

MULTIPLE FLEXIBLE SEAFLOOR-SURFACE LINKING APPARATUS COMPRISING AT LEAST TWO LEVELS

PRIORITY CLAIM

This is a U.S. national stage of application No. PCT/FR2012/052717, filed on Nov. 23, 2012. Priority is claimed on France Application No. FR1160934, filed Nov. 30, 2011, the content of which is incorporated herein by reference.

BACKGROUND OF THE INVENTION

The present invention relates to an installation of multiple flexible bottom-to-surface connections between well heads, pieces of equipment, or the ends of undersea pipes resting on the sea bottom, and a floating support on the surface, the installation comprising a multiplicity of flexible lines, in particular flexible pipes, having their bottom ends connected to the ends of a plurality of undersea pipes resting on the sea bottom or directly to well heads or to pieces of equipment resting on the sea bottom.

In the present description, the term "flexible line" is used to mean pipes or cables capable of accepting large amounts of deformation without that giving rise to significant return forces, such as the flexible pipes defined below, and also cables or pipes for transferring power or information such as electric cables, control cables, or hydraulic fluid transfer pipes powering hydraulic equipment such as actuators, or pipes containing optical fibers; a flexible line may also be a control umbilical made up of one or more hydraulic pipes and/or electric cables for transmitting power and/or information.

The technical sector of the invention is more particularly the field of fabricating and installing bottom-to-surface connections for extracting oil, gas, or other soluble or meltable material or mineral material in suspension from under the sea, via a submerged well head, and up to a floating support, in order to develop production fields located off-shore at sea. The main and immediate application of the invention lies in the field of producing oil.

In general, the floating support has anchor means enabling it to remain in position in spite of the effects of currents, wind, and swell. It also generally includes means for storing and treating oil together with off-loading means for off-loading to off-loading tankers, which generally call at regular intervals in order to remove the production. The common term for such a floating support is floating production storage off-loading, and the initials FPSO are used throughout the description below.

However it is also possible for the support to be a semi-submersible floating platform installed temporarily at sea for a few years, e.g. while waiting for an FPSO type floating support to be built and installed permanently.

Bottom-to-surface connections with an undersea pipe resting on the sea bottom are known, that are of the hybrid tower type and that comprise:
- a vertical riser having its bottom end anchored to the sea bottom via a flexible hinge, that is connected to a said pipe resting on the sea bottom, and that has its top end tensioned by a float submerged in the subsurface, the top end being connected to the float; and
- a connection pipe, generally a flexible connection pipe, between the top end of said riser and a support floating on the surface, said flexible connection pipe, where appropriate, taking up the shape of a catenary curve hanging under the effect of its own weight, i.e. it goes down well below the float and then subsequently rises up to said floating support.

Bottom-to-surface connections are also known that are made by continuously raising strong rigid pipes up to the subsurface, such pipes being made of thick-walled tubular elements of steel that are welded or screwed together, and that take up a catenary configuration with curvature that varies continuously throughout the suspended length, which pipes are commonly referred to as steel catenary risers (SCR) or else as "catenary type rigid pipes" or as "SCR type risers". Such a catenary pipe may go up as far as the support floating on the surface, or only as far as a float submerged in the subsurface that serves to tension its top end, which top end is then connected to a floating support by a hanging flexible connection pipe.

Bottom-to-surface connections are also known that enable a floating support to be connected to pipes or installations on the sea bottom that are constituted entirely by flexible pipes, in particular when the depth of water is not very great, e.g. lying in the range 300 meters (m) to 750 m, or even 1000 m, where the well heads or the pieces of undersea equipment are not very far from said floating support.

The present invention relates to flexible pipe support means for an installation of multiple bottom-to-surface connections comprising multiple flexible pipes arranged on at least two different levels in height.

It should be recalled that the term "flexible pipe" is used herein to mean pipes, sometimes also known as "hoses", that are well known to the person in the art and that are described in standards documents published by the American Petroleum Institute (API), more particularly under the references API 17J and API RP 17 B. Such flexible pipes are manufactured and sold in particular by the supplier Technip-Coflexip France. These flexible pipes generally comprise internal sealing layers made of thermoplastic materials associated with layers suitable for withstanding internal pressure in the pipes, generally made of steel or of composite materials and used in the form of spiral-wound strips that touch one another inside the thermoplastic pipes in order to withstand internal bursting pressure, and associated with external reinforcement over the thermoplastic tubular layer and likewise in the form of touching spiral-wound strips, but using a pitch that is longer, i.e. using a smaller helix angle, particularly one lying in the range 15° to 55°.

When developing certain fields, a plurality of well heads are connected in parallel by a plurality of bottom-to-surface connections leading to a common floating support. Under such circumstances, each of said bottom-to-surface connections needs to be kept apart from its immediate neighbors in order to avoid any interference and any impacts, not only between floats, but also between flexible pipes and electric cables and other flexible lines such as electric cables or umbilicals transferring information signals and providing the connection with said floating support, when said flexible pipes are subjected to the effects of current, and when said floating support is itself subjected to swell, wind, and current.

In the development of certain fields, each of the well heads is connected individually to a said floating support and there are therefore very many bottom-to-surface connections, so it becomes impossible to install any more since the length of the side of the support is limited and as a result it can accept only a limited number of bottom-to-surface connections.

It is desired to install as many bottom-to-surface connections as possible from a given floating support in order to optimize the working of oil fields. That is why various systems have been proposed enabling a plurality of vertical risers to be associated with one another in order to reduce the occupancy of the working field and in order to be able to install a larger number of bottom-to-surface connections connected to a common floating support. Typically, it is necessary to be able to install up to 30 or even 40 bottom-to-surface connections from a common floating support.

Documents WO 02/66786, WO 02/103153, and WO 2011/061422 in the name of the Applicant describe hybrid towers with multiple flexible pipes and risers arranged in fans enabling a large number of connections to be associated with a common floating support in spite of the problem of the movements of said risers interfering with one another since they are all subjected to the same movement as their top tensioning floats under the effect of the movements of the floating support on the surface where it is subjected to swell, wind, and currents.

In those installations, proposals are made to arrange two flexible pipes that are superposed or arranged side by side between the floating support and the top ends of risers or SCRs, the two flexible pipes being guided in the subsurface by two respective troughs fastened in superposed or laterally offset manner to a float for tensioning a third riser that is located closer to the floating support than are the first two risers, each said trough thus defining two flexible pipe portions in the form of hanging double catenaries on either side of the trough. That configuration presents the advantage of making it possible to bring the flexible pipes to the top end of the riser that is relatively far from the floating support without the bottom points of said hanging double catenary pipe portions being too deep.

When a multiplicity of bottom-to-surface connections are used that are constituted exclusively by flexible pipes, it is also necessary to space the various connections apart from one another, at least for the following reasons.

Firstly, flexible pipes have fragile outer sheaths, and it is essential to prevent them from striking against one another.

Secondly, the flexible pipes are used by passing via arch-shaped guide elements referred to as "troughs", each defining a rigid bearing surface of convex curved shape as described below, so as to define two flexible pipe portions, comprising a first flexible pipe portion in a hanging double catenary configuration between the floating support and said trough, and a second flexible pipe portion in a single catenary configuration between said trough and the point of tangential contact between said flexible pipe and the sea bottom.

Those arch-shaped guide elements referred to as troughs are well known to the person skilled in the art, they present:
  a longitudinal section of curved shape in section in the axial vertical longitudinal plane of the trough, preferably a section of circular shape with its concave side facing towards the bottom of the sea, and a convex outside surface on which the pipe is placed; and
  a cross-section in the vertical plane perpendicular to the vertical axial longitudinal plane of the trough presenting a shape with a curved bottom that is preferably circular with its concave side facing upwards and constituted by said top outside surface lying between longitudinal side walls serving to hold and guide the pipe in the longitudinal direction between said side walls.

In known manner, the radius of curvature of the longitudinal curve with its concave side facing downwards is greater than the minimum radius of curvature of the pipe passing via said trough.

Such a trough serves to impart controlled curvature to the portion of flexible pipe that it supports so as to avoid excessive curvature which would irremediably damage said pipe.

The function of such troughs and the arrangement of the flexible pipes serves to create a hanging double category curve on the upstream side of the trough between the floating support and the trough so as to avoid or reduce as much as possible the stresses and movements of the flexible pipes at their point of contact with the sea floor which would destructure the sea floor by creating trenches and would weaken the pipe because of the pipe being flexed in alternation in the region of the point of contact, thereby requiring its structure to be reinforced and/or requiring the sea floor to be protected. The stresses and movements at the point of contact between the flexible pipe and the sea floor are indeed reduced as a result of the stresses and the movements of the pipe being damped by the first flexible pipe portion in the form of a hanging double catenary that is created by causing the pipe to pass over said trough, the first portion being more involved in absorbing horizontal movements of the floating support than is the second flexible pipe portion in the shape of a single catenary.

When suspended from its two ends, a said undersea flexible line takes up under its own weight the shape of a hanging double catenary, as is known to the person skilled in the art, i.e. it goes down in a catenary configuration to a low point where its tangent is horizontal (see below), after which it rises up to said floating support, which hanging catenary can accommodate large amounts of movement between its ends, which movements are absorbed by deforming the flexible pipe, in particular in the rising or descending portions on either side of the low point of said hanging catenary.

It should be recalled that the flexible pipe portion between an end from which it is suspended and the low portion of horizontal tangent, specifically in said second flexible pipe portion the point of contact with the sea bottom, adopts a symmetrical curve as formed by a hanging pipe portion of uniform weight subjected to gravity, which curve is known as a "catenary" and is a mathematical function of the hyperbolic cosine type:

$$\cosh x = (e^x + e^{-x})/2$$

associating the abscissa and the ordinate of an arbitrary point of the curve in application of the following formulae:

$$y = R_0(\cosh(x/R_0) - 1)$$

$$R = R_0 \cdot (Y/R_0 + 1)^2$$

where:
  x represents the distance in the horizontal direction between said point of contact and a point M on the curve;
  y represents the height to the point M (x and y are thus the abscissa and ordinate values of a point M on the curve relative to a rectangular frame of reference having its origin at said point of contact);
  $R_0$ represents the radius of curvature at said point of contact, i.e. the point with a horizontal tangent; and
  R represents the radius of curvature at the point M(x,y).

Thus, the curvature varies along the catenary from the top end where its radius of curvature has a maximum value Rmax to the point of contact with the sea floor where its radius of curvature has a minimum value Rmin (or $R_0$ in the above formula). Under the effect of waves, wind, and current, the surface support moves laterally and vertically, thereby having the effect of raising or lowering the pipe of catenary shape where it touches the sea bottom.

For a bottom-to-surface connection in the form of a single catenary, the most critical portion of the catenary is situated in its portion close to the point of contact, and most of the forces in this bottom portion of the catenary are in fact generated by the movements of the floating support and by the excitations that are applied to the top portion of the catenary, which is subjected to current and to swell, with all of these excitations then propagating mechanically along the pipe to the bottom of the catenary.

The essential function of the first portion of the flexible pipe in the form of a hanging double catenary that is located upstream from the trough is thus more specifically to absorb, at least in part, the movements of the pipe and/or the movements of the floating support to which said flexible pipe is connected, by mechanically decoupling movement between respectively said floating support and said second flexible pipe portion in the form of a single catenary. However another function is also to reduce the traction forces exerted by said second flexible pipe portion on the undersea equipment and/or the end of the pipe resting on the sea bottom to which it is connected, as the case may be.

In the prior art, the intermediate support troughs for said flexible pipes are held in the subsurface at a certain depth by supporting floats from which each of the troughs is suspended. However those floats are subjected to large amounts of movement which means that sufficient distance must be provided between the various floats in order to ensure that they do not strike against one another.

In WO 00/31372 and EP 0 251 488, there are described pluralities of bottom-to-surface connections in which flexible pipes extend from a floating support to the bottom of the sea, passing via a plurality of troughs all arranged at the same height side by side with lateral offsets, said troughs being supported by a bulky structure resting on the sea bottom and by a bulky structure suspended from floats and anchored to the bottom of the sea.

Those constraints involve spreading out the working zone and limiting the number of flexible bottom-to-surface connections that can be connected to a common floating support, via its sides, in order to avoid interference between the various flexible connections and the various floats.

That is why it is desired to provide an installation suitable for making it possible from a given floating support to use a plurality of flexible type bottom-to-surface connections, with reduced size and movement, and that is also as simple as possible to lay, being suitable for being built up at sea from a pipe laying ship.

SUMMARY OF THE INVENTION

An object of the present invention is thus to provide an installation with a large quantity of flexible bottom-to-surface connections suitable for connecting a floating support with a plurality of well heads and/or undersea installations installed on the sea bottom, in particular at medium or great depth, i.e. in depths of water of more than 300 m, and possibly up to depths in the range 500 m to 1000 m.

Still more particularly, the problem posed in the present invention is thus to provide an installation with a multiplicity of flexible pipe bottom-to-surface connections from a common floating support, for which the methods of laying and installing the installation make it possible simultaneously:

to reduce the installation distance between the various flexible bottom-to-surface connections, i.e. to make it possible to install a large number of flexible bottom-to-surface connections in as small a space as possible, or in other words with a reduced "footprint" on the sea floor, thus making it possible, amongst other things, to increase the number of bottom-to-surface connections that can be installed along the side of an FPSO or of a platform, without said bottom-to-surface connections interfering with one another; and to enable the various pipes to be fabricated and installed easily by sequential fabrication and laying from a laying ship on the surface; and finally to optimize the use of buoyancy means in the event of installation being spread out in time over a long period between installing the various flexible bottom-to-surface connections, and without it being necessary to have prior knowledge of the number of connections that are to be laid, nor of their characteristics in terms of dimensions and unit weight.

During a stage of designing the development of an oil field, the oil deposit is known incompletely, so production at full rate often makes it necessary, after a few years, to revise initial production plans and the organization of the associated equipment. Thus, during initial installation of the system, the number of bottom-to-surface connections and the way they are organized is defined relative to estimated needs, which needs are almost always revised upwards once the field is put into production, either for recovering crude oil, or because it is necessary to inject more water into the deposit, or indeed because it is necessary to recover or to reinject more gas. As the deposit becomes depleted, it is generally necessary to drill new wells and to inject water or gas, or indeed to drill production wells at new locations on the field so as to increase the overall recovery rate, thereby correspondingly complicating the set of bottom-to-surface connections connected to the side of the FPSO.

Another problem of the present invention is also to provide an installation of flexible bottom-to-surface connections of great strength and at low cost, in which the methods for fabricating and installing the various component elements are simplified and also of low cost, and can be performed at sea from a laying ship.

Another object of the present invention is to provide an installation using a small number of floats for supporting or tensioning said flexible pipes, in particular in association with the intermediate troughs.

In order to do this, the present invention provides a bottom-to-surface connection installation between a common floating support and the sea bottom, the installation comprising a plurality of flexible lines comprising flexible pipes between said floating support and the sea bottom where they are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a hanging double catenary configuration between the floating support and said trough, and a second flexible line portion in a single catenary configuration between said trough and the point of contact between said flexible pipe and the sea bottom. According to the invention, the installation includes at least one trough support structure comprising a base-forming bottom portion resting on and/or anchored to or embedded in the sea bottom and a top portion supporting at least two troughs, respectively a bottom trough and a top trough arranged at different heights such that the low point of the hanging double catenary of the first flexible line portion passing via the bottom trough is situated below the low point of the hanging double catenary of said first flexible line portion passing via the top trough.

This configuration enables the point of contact with the sea floor for the flexible line passing via the bottom trough to be closer to said base than the point of contact with the sea floor for the flexible line passing via the top trough.

The advantages of the installation of the present invention include the following in particular:

installing a trough support structure carrying a plurality of troughs leads to a relative reduction in the number of floats in accordance with the object of the present invention; and the way the troughs and the flexible pipes are arranged with their low points of horizontal tangent in the hanging double catenaries located at different heights, and where appropriate also the arrangement of the points of contact with the sea floor for the flexible pipes at different distances, contribute(s) to reducing or even eliminating any risk of contact or impact between said flexible pipes, in particular in their said first pipe portions in the form of hanging catenaries.

The term "floating support" is used herein to cover both a barge or ship and a semi-submersible platform of the above-described type.

It can be understood that said top portion of the support structure, supporting or having said troughs fastened thereto in accordance with the invention is a rigid structure other than a float.

More particularly, said top portion of said trough support structure comprises at least two rigid support elements, respectively a bottom element and a top element, arranged at different heights and each supporting a plurality of troughs that are laterally offset in a direction (YY') in a vertical plane perpendicular to the vertical axial plane of said support structure and of said rigid support elements and/or perpendicular to the vertical longitudinal axial planes of said troughs, which are preferably parallel to one another, said troughs preferably being arranged symmetrically relative to a vertical axial plane of said support structure and of said rigid support elements.

This embodiment is particularly advantageous insofar as it is possible from said trough support structure to splay apart two adjacent second flexible pipe portions passing through two adjacent troughs supported by the same top or bottom rigid support element by an angle $\alpha_2$ that is greater than the angle $\alpha_1$ between the corresponding two first flexible pipe portions of the same flexible pipes.

It is thus possible to increase the angular spread of the fan of said flexible pipes from said support structure and thus to extend the geographical zone in which well heads or the ends of undersea pipes can be installed so as to be connected via said flexible pipes to a common floating support.

Consequently, and more particularly, the two second flexible line portions of two flexible lines pass via two adjacent troughs supported by a common rigid support element, the troughs being laterally offset and arranged angularly relative to each other at an angle ($\alpha_2$) that is greater than the angle ($\alpha_2$) of the two first portions of the flexible lines of the same two flexible lines. Preferably, it can be understood that a bottom-to-surface connection installation of the invention includes at least two of said trough support structures with said vertical axial planes being disposed angularly at an angle $\alpha$.

More particularly, the number of troughs supported by a common rigid support element for bottom or top troughs may more particularly lie in the range 10 to 30.

In a particular embodiment, a said flexible pipe is held in a said trough by retaining means and/or attachment means.

This characteristic seeks to stabilize the flexible pipe and to encourage loads and movements to occur in said first flexible pipe portion.

More particularly, said retaining means or attachment means are constituted by a tubular device forming a ring that is prepositioned around said pipe at a predetermined distance from the end of the pipe that is fastened to the floating support, said ring being suitable for being blocked and/or locked in said trough, said trough preferably including a first portion of an internal channel containing or suitable for containing a said flexible pipe but not capable of containing said pipe surrounded by said ring, said first trough portion being situated at the end of the trough that is closer to the floating support, the cross-sectional width, in particular the diameter, the internal channel of said first trough portion being smaller than the cross-sectional width of the internal channel of a second trough portion arranged at the end of the trough that is further from the floating support, the internal channel of said second trough portion containing or being suitable for containing a said flexible pipe surrounded by said ring, said ring being retained by a shoulder at the zone where the width varies, the variation in width preferably being discontinuous, between the two internal channels of the first and second trough portions.

Said ring may be made up of two half-rings of semicircular section that are pressed against the pipe and that are assembled together, e.g. by bolts.

It can be understood that the positioning of said ring is determined by the length desired for the first flexible pipe portion as a function of the height of the low point of said first flexible pipe portion in a hanging double catenary, which also depends on the height of the trough and on its distance from the floating support.

In a first particular variant embodiment, said rigid support elements for troughs form horizontal beams. The troughs supported by a common rigid support element are arranged at the same height.

In another variant embodiment, the troughs supported by a common rigid support element are arranged at different heights, said rigid support element preferably defining a trough support surface that is plane and sloping.

Either way, and preferably, the low points of two first flexible line portions passing via adjacent troughs supported by a common rigid support element are at different heights.

In a preferred embodiment, said trough support structure is a rigid structure comprising a rigid tower rising above a said base resting on and/or anchored to the sea bottom to which it is rigidly secured. The term "rigid tower" is used to mean that said base-forming bottom portion and said top portion of the support structure supporting said troughs are connected together by a rigid structure.

More particularly, said base is a metal lattice structure extending horizontally and resting on the sea bottom, and said rigid tower is a metal lattice structure rising vertically and supporting at least two rigid support elements, a top support element and a bottom support element forming beams that extend, preferably symmetrically, on either side of the tower along at least two vertical levels, said troughs being fastened on top of the beams, said tower being fastened to said metal lattice structure of said base by sloping rigid connection and reinforcing elements.

It can be understood that the metal lattice structure of said base extends over a distance sufficient to act as a sufficient counterweight to stabilize the tower.

In this embodiment of the rigid support structure, the symmetry with which the trough and the flexible pipes are positioned, and more generally the symmetry of the support structure itself relative to a said vertical longitudinal axial plane seeks to ensure that said structure is subjected essentially to compression forces, with bending forces being in equilibrium on either side of the vertical rigid tower.

In another variant embodiment, said trough support structure is a hinged structure comprising at least two rigid support elements, a top element and a bottom element, forming beams arranged one above the other and connected together by first flexible connection elements such as first stays, said bottom trough support element being connected to said base by second flexible connection elements such as second stays, said top and bottom rigid support elements being held one above the other and above a said base by at least one submerged buoyancy element fastened to at least one said top trough support element suitable for tensioning said first and second stays, said base preferably being embedded in the sea bottom.

More particularly, said top rigid support element is suspended from a submerged top float to which it is connected by third flexible connection elements such as slings, and preferably said top rigid support element is supported by a bottom float on which it is fastened.

In both embodiments of the rigid support structure, it is preferable for the vertical longitudinal axial plane of the top and bottom troughs that are the closest together to lie on the same axis and in the same plane for both troughs so as to avoid, or at least reduce, bending forces on said support structure.

In the variant embodiment in which the trough support structure is a hinged structure, the second flexible pipe portion in the shape of a single catenary is less stabilized than when using a rigid support structure, however the stresses and the movements to which it is subjected, in particular at its point of contact with the sea floor are nevertheless reduced considerably because of the tensioning of said support structure by said floats.

In order to make it easier to lay the flexible pipes from a laying ship as explained below in the description, said top trough element, or the ends of the troughs that it supports, include(s) a deflector of profile suitable for avoiding damaging any portion of flexible pipe that might come into contact with said deflector while the pipe is being laid on a said bottom trough.

Also preferably, said top trough is at a height above the closest bottom trough such that the segment passing via the longitudinal end of the top trough and the top of the bottom of the bottom trough forms an angle $\alpha_3$ of at least 30°, and preferably of at least 45°, relative to the horizontal.

The top of the bottom of the trough is the point situated halfway along the curvilinear length of the trough.

Said support structure may also support troughs used for guiding and supporting flexible lines other than said flexible pipes, and thus of smaller diameter.

BRIEF DESCRIPTION OF THE DRAWINGS

Other characteristics and advantages of the present invention appear in the light of the following detailed description given with reference to the following figures, in which:

FIG. 4 is a side view of a FIG. 1 bottom-to-surface connection installation between an anchored floating platform and two rigid support elements 4-2a, 4-2b respectively supporting two series of arch-shaped troughs, said rigid support elements being connected together by a first series of stays, and connected to a foundation 4-1 resting on the sea bottom 5 by a second series of stays, the assembly being tensioned upwards by means of a float 4-4a;

FIG. 5A is a side view of a first step in installing a flexible pipe on the bottom trough 3b;

FIG. 8A is a vertical cross-section through the tops of the top troughs 3a of a rigid support structure 4 having two horizontal beams 4-2a and 4-2b supporting a plurality of top troughs 3a and bottom troughs 3b, with dashed lines showing the first flexible pipe portions 1-1 together with their low points 1-1a, and with dotted lines showing the bottom troughs 3b;

FIG. 8B is a view similar to FIG. 8A, but the vertical cross-section is through the tops of the bottom trough 3b with the first flexible line portions 1-1 shown in dashed lines and the top troughs 3a in dotted lines;

FIG. 9 is a side view of a support structure in which the top troughs are offset relative to the bottom troughs in a direction towards the floating support; and FIG. 10 shows a variant embodiment of a trough support structure 4 in which the top and bottom rigid support elements 4-2a and 4-2b are beams that slope symmetrically relative to the vertical central tower 4-2c.

DETAILED DESCRIPTION OF THE PRESENTLY PREFERRED EMBODIMENTS

Figure 1:
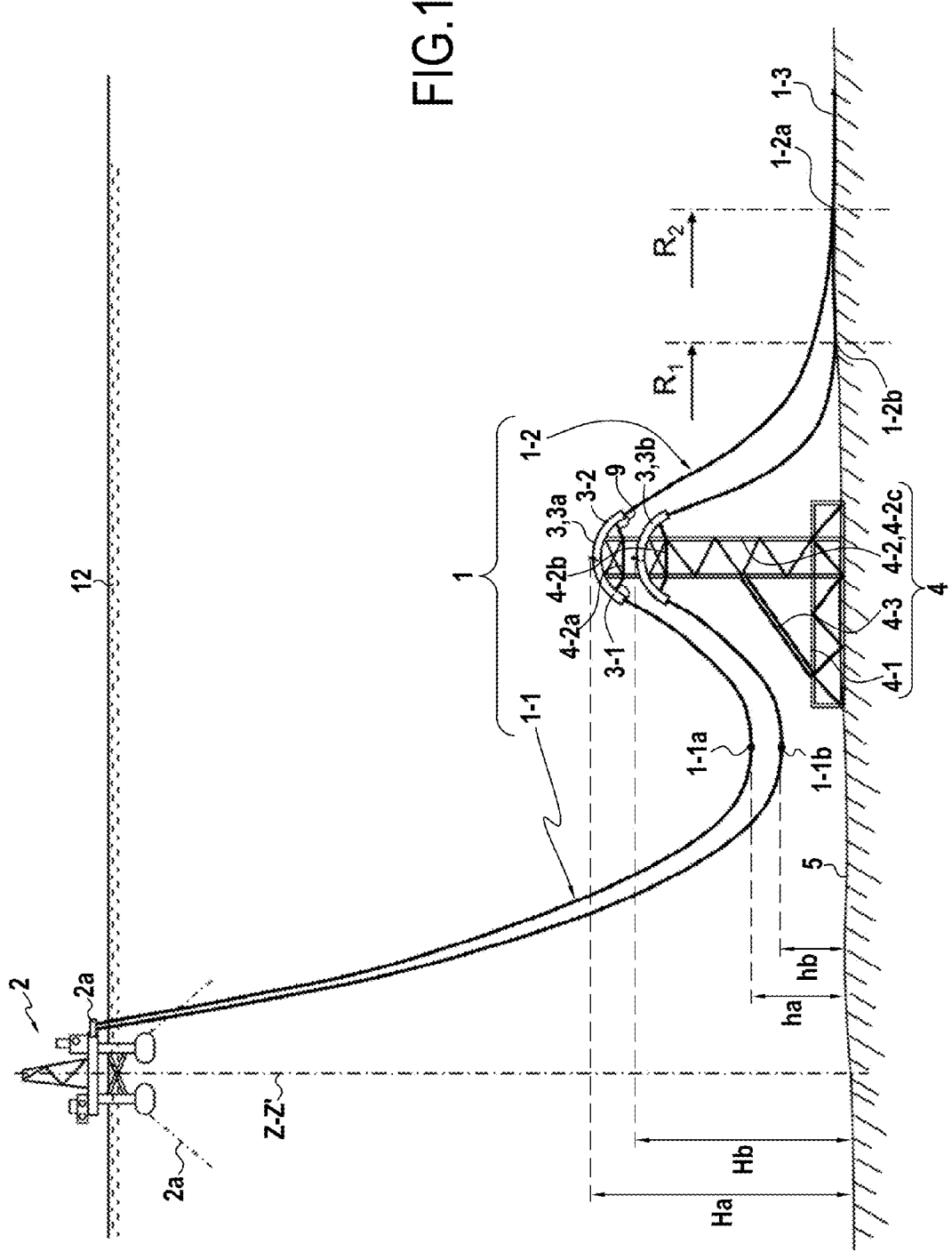
FIG. 1 is a side view of a bottom-to-surface connection installation of the invention between an anchored floating platform 2 and a metal support structure 4 supporting two series of arch-shaped troughs 3, 3a-3b, and standing on the sea bottom 5.

FIG. 1 shows a bottom-to-surface connection installation having two flexible pipes 1 connected at one end 2a to a semi-submersible floating platform 2 that is held in position by anchor lines 2a, with the other ends of said flexible pipes resting on the sea bottom 5 at 1-3. The two flexible pipes 1 extend at different heights and they come into contact with the sea floor 5 at contact points 1-2a and 1-2b that are at different distances from the axis ZZ' of the floating support 2.

The bottom-to-surface connection installation has a rigid support structure 4 comprising a rigid vertical tower 4-2c constituted by a metal lattice structure supporting top and bottom rigid support elements 4-2a and 4-2b at its top, which two elements form horizontal beams, extending symmetrically on either side of the tower 4-2c. Top troughs 3a are fastened over the top beam 4-2a and bottom troughs 3b are fastened over the bottom beam 4-2b. All of the top and bottom troughs 3a and 3b are preferably of the same length and with the same radius of curvature, and they are arranged to be mutually parallel, being offset laterally in the transverse direction YY' perpendicular to the longitudinal direction XX' of the troughs.

Figure 2:
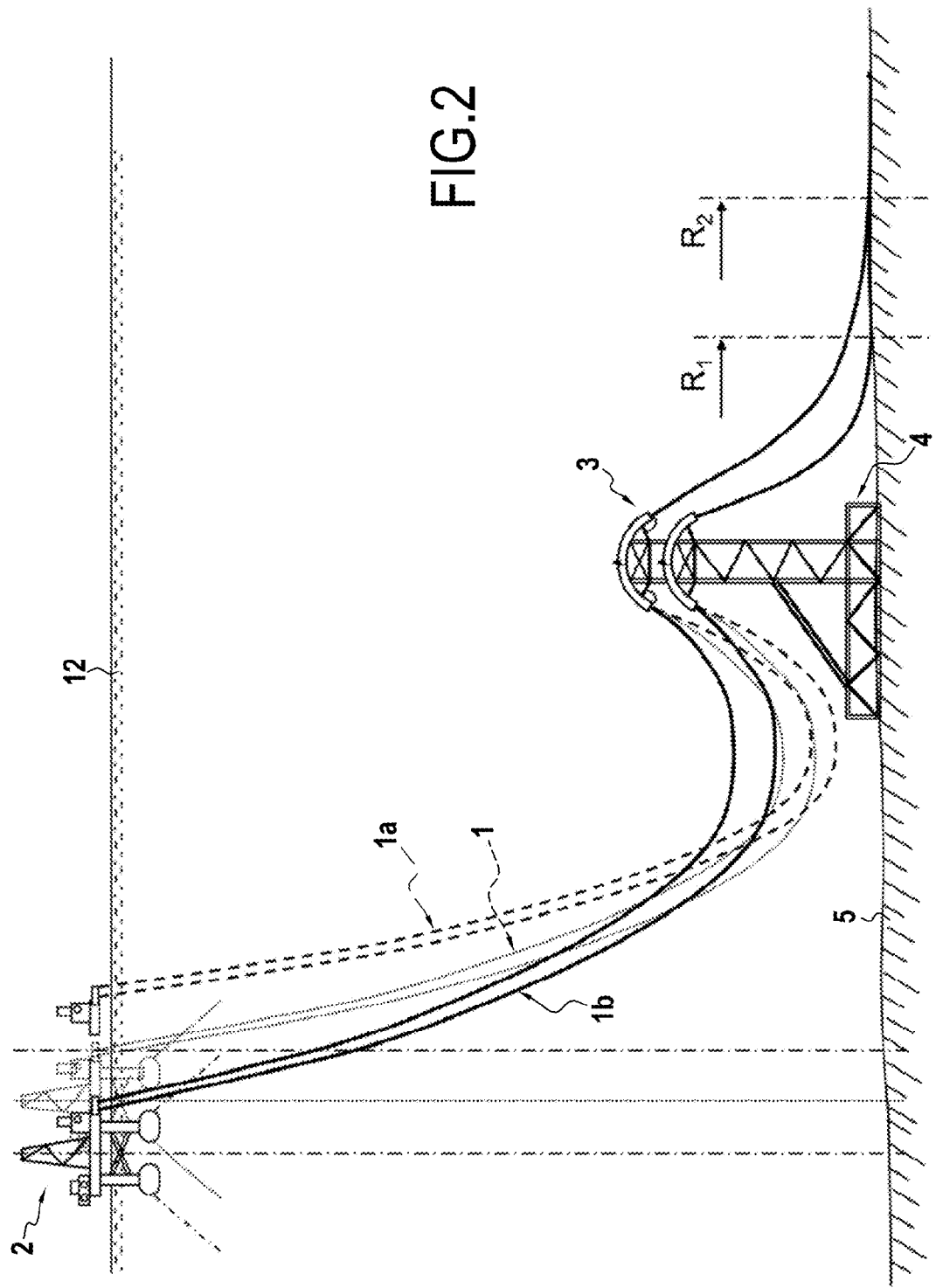
FIG. 2 is a side view of a FIG. 1 installation showing the deformations to which flexible pipes 1 are subjected as a function of the excursion of anchored floating platform shown at its furthest 1b and at its closest 1a relative to said support structure 4.
Figure 3:
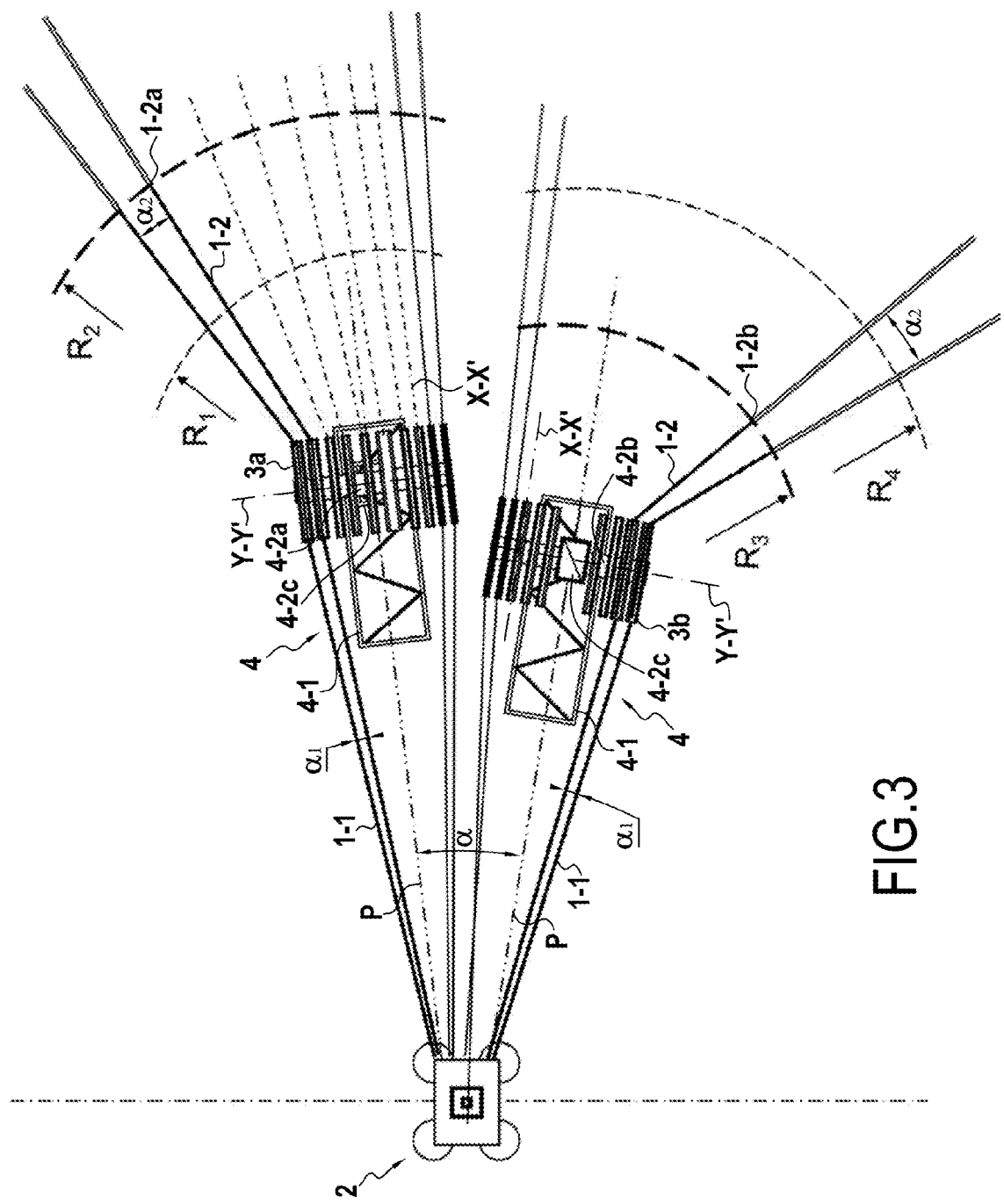
FIG. 3 is a plan view of an installation of the type shown in FIG. 1, but with two support structures 4 illustrating the fan arrangement of a plurality of flexible bottom-to-surface connections between a platform 2 and two metal support structures 4 standing on the sea bottom.

In FIGS. 1 to 3, the top and bottom troughs 3a and 3b of a single support structure 4 are superposed, i.e. they are not offset relative to one another in the longitudinal direction XX' of the troughs, in contrast to the embodiment of FIG. 9, where the bottom troughs 3b are offset forwards or downstream, i.e. a little further away from the floating support 2 than the top troughs 3a.

FIG. 3 shows two installations with two support structures 4 arranged at different distances from the support structure 2, but both having the same shape, one of the two structures, the structure closer to the floating support, being shown in section immediately above the bottom beam 4-2b and the bottom troughs 3b, while the other support structure 4, the structure further away from the floating support 2, is shown in plan view above the top troughs and beams 3a, 4-2a. The second flexible pipe portions 1-2 passing via the top troughs 3a have points of contact 1-2a with the sea floor 5 that are situated substantially on a circle of radius R2 (for the support structure 4 of FIG. 3 that is further from the floating support 2) or of radius R4 (for the support structure 4 of FIG. 3 that is closer to the floating support 2). The points of contact 1-2b of the second pipe portions 1-2 passing via the bottom troughs 3b are likewise situated substantially on a circle of radius R1 (for the support structure 4 of FIG. 3 that is further from the floating support 2) or of radius R3 (for the support structure 4 of FIG. 3 that is closer to the floating support 2), where R1<R2 and R3<R4.

In FIG. 3, the top beam 4-2a supports ten top troughs 3a having their tops all at the same height Ha, as shown in FIG. 1, with only four flexible pipes being arranged on those pairs of troughs that are at the lateral ends in the direction YY' of the top beam 4-2a. The bottom beam 4-2b supports nine bottom troughs 3b all at the same height Hb, likewise having four flexible pipes installed thereon, namely two flexible pipes in each of two pairs of troughs at the respective ends of the beam in the lateral direction YY'.

Each of the various flexible pipes 1 passing via the troughs 3a and 3b has a first flexible pipe portion 1-1 in a hanging double catenary configuration between the floating support 2 and said trough, and a second flexible pipe portion 1-2 in a single catenary configuration between said trough and its point of contact 1-2a or 1-2b with the sea bottom.

Figure 4:
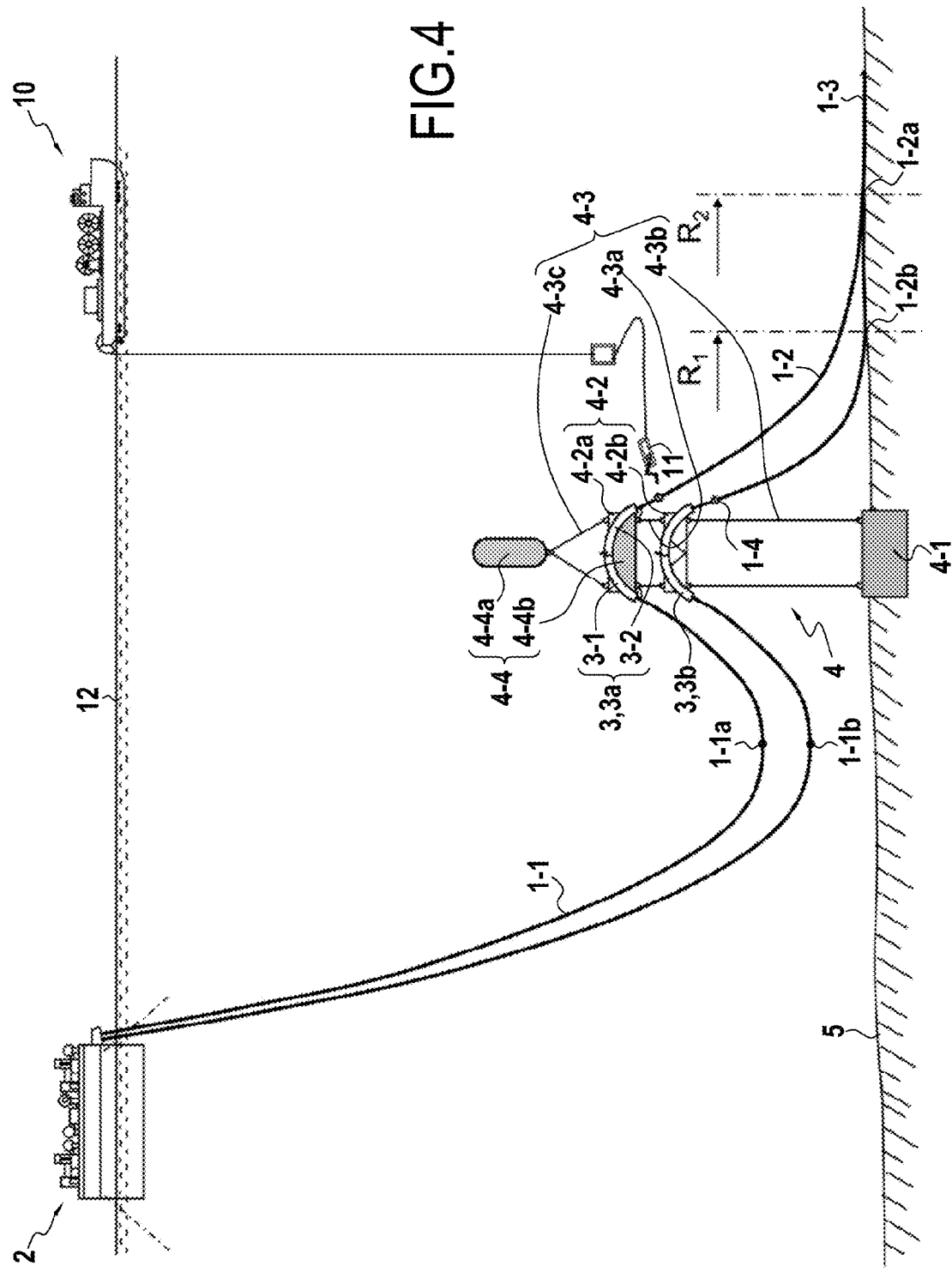

In FIGS. 1, 2, and 4, the low points 1-1a of the first pipe portions 1-1 passing via the top troughs 3a are situated above the low points 1-1b of the first pipe portions 1-1 passing via the bottom troughs 3b, and the second flexible pipe portions 1-2 passing via the top troughs 3a have points of contact 1-2a with the sea floor 5 that are situated substantially on a circle of radius R2 (for the support structure 4 of FIG. 3 that is further from the floating support 2) or of radius R4 (for the support structure 4 of FIG. 3 that is closer to the floating support 2). The points of contact 1-2b of the second pipe portions 1-2 passing via the bottom troughs 3b are likewise situated substantially on a circle of radius R1 (for the support structure 4 of FIG. 3 that is further from the floating support 2) or of radius R3 (for the support structure 4 of FIG. 3 that is closer to the floating support 2), with R1<R2 and R3<R4.

FIGS. 1 to 3 show flexible pipes 1 that are continuous from their attachment points 2b on the platform 2 to beyond their points of contact 1-2a, 1-2b on the sea floor in the pipe portions 1-3 resting on the sea bottom 5. Nevertheless, it is also possible for each of said flexible pipes to be constituted by a plurality of flexible pipes connected to one another via intermediate fittings in particular fittings of flange type 1-4 or using other connection means, said connection means possibly also being situated advantageously downstream from said troughs as shown in FIG. 4.

The platform 2 is subjected to the effects of swell, wind, and currents, and as a result it can move in all directions. The anchor system 2a limits excursions of the platform 2 and tends to restore it to the neutral position shown in FIG. 1. FIG. 2 is a side view showing how the flexible pipes 1 become deformed depending on whether the platform moves closer to the structure 4 (configuration 1a) or further away therefrom (configuration 1b). It can be seen that the second flexible pipe portions 1-2 remain substantially stationary regardless of the movements of the platform on the surface, as explained above.

Because the low points 1-1a and 1-1b of the two first pipe portions 1-1 of the pipes are at different heights ha and hb, and also because the two second pipe portions 1-2 of the two pipes passing via the top and bottom troughs 3a and 3b are likewise at different heights with different points of contact 1-2a and 1-2b at different distances from the structure 4, the suspended top and bottom pipe portions 1-1 and 1-2 cannot interfere with each other.

Said trough support structure 4 has a bottom portion 4-1 serving as a base that is constituted by a metal lattice structure extending horizontally and resting on or anchored to the sea bottom over a distance that is sufficient to act as a counterweight and to stabilize the rigid tower 4-2c that has its bottom fastened thereto. The rigid tower 4-2c is a metal lattice structure having its bottom fastened to the base-forming lattice structure 4-1 and supported by sloping rigid connection and reinforcement elements 4-3.

In FIG. 3, the two horizontal beams 4-2a and 4-2b supporting the top and bottom troughs 3a and 3b respectively are superposed and arranged at the same distance from the axis ZZ' of the floating support 2. In contrast, in FIG. 9, the bottom troughs 3b are offset forwards a little, i.e. at a greater distance from the axis ZZ' of the floating support 2 than the top troughs 3a, so as to make it easier to lay a flexible pipe on a bottom trough 3b, as explained below.

FIGS. 8A and 8B show that the troughs 3a and 3b may have diameters or widths in vertical cross-section that vary and that match the diameters of the flexible pipes or lines that they are to hold.

FIG. 8A shows that the various low points 1-1a of the first flexible pipe portions upstream from the top troughs 3a are arranged at varying heights so that the bottom points 1-1a of two first flexible pipe portions supported by adjacent top troughs 3a supported by the top beam 4-2a are at different heights H1 and H2. In FIG. 8B, the low points 1-1b of two first flexible pipe portions 1-1 supported by adjacent bottom troughs 3b on the bottom beam 4-2b are likewise at different heights H1' and H2'.

In FIGS. 3, 8A, and 8B, the various pipes of the various flexible lines providing the flexible bottom-to-surface connections between the support 2 and pieces of equipment of a common well head are grouped together by top and bottom troughs 3a and 3b situated in a common angular corridor that is as narrow as possible in the fan constituted by the set of flexible pipes providing junctions between a common floating support 2 and a plurality of well heads. It is made possible to group together in this way the flexible pipes that provide junctions between a common well head and the floating support by having the troughs installed at a plurality of heights on at least two levels, and also by the possibility of installing the low points 1-1a and 1-1b of the first pipe portions at different heights, and also the points of contact 1-2a and 1-2b of the second pipe portions with the sea floor at different distances from the support structure 4.

FIG. 10 shows a second embodiment of a rigid support structure in which the support elements 4-2a and 4-2b for the top and bottom troughs are constituted by respective straight beams 4-2a'/4-2a'' and 4-2b'/4-2b'' that slope symmetrically relative to the rigid central vertical tower 4-2c. This embodiment presents the additional advantage of the various top and bottom troughs 3a and 3b being at different heights on their respective sloping beams, such that the arrangement of the various low points 1-1a and 1-1b of the adjacent first flexible pipe portions 1-1 can be arranged more easily at different heights H1 and H2.

In FIGS. 4 and 5, said trough support structure 4 is a hinged structure having top and bottom horizontal beams 4-2a and 4-2b constituted by two metal lattice structures that are connected together by first stays 4-3a. The assembly made up of these two beams 4-2a and 4-2b forms the top portion of the support structure 4. The bottom beam 4-2b is connected to a base 4-1 embedded in the sea bottom 5 by second stays 4-3b. The top beam 4-2a is suspended from a submerged top float 4-4a to which it is connected by slings 4-3c. The float 4-4a serves to tension the first and second stays 4-3a and 4-3b in such a manner as to hold them in a vertical position and ensure that the top beam 4-2a is maintained at a given height Ha above the bottom beam 4-2b that is at a lower height Hb, as shown in FIG. 1.

The top troughs 3a fastened to the top beam 4-2a are themselves supported by additional floats 4-4b incorporated in said beam in order to enhance the tensioning of the first and second stays 4-3a and 4-3b.

In the same way, it is advantageous to incorporate buoyancy elements in the structure of the bottom beam 4-2b.

As in FIGS. 3 and 8, the top and bottom beams 4-2a and 4-2b support respective pluralities of top troughs 3a and bottom troughs 3b.

For depths of water lying in the range 500 m to 1000 m, and for a large quantity of flexible pipes, e.g. 18 or 24 flexible pipes, a rigid support structure 4 in the embodiment of FIGS. 1, 2, and 3 may have a height (Ha) lying in the range 100 m to 150 m and may weigh several thousand (metric) tonnes (t), e.g. 5000 t to 6000 t. In contrast, a support structure 4 of the hinged type as shown in FIGS. 4 and 5 is of weight that is considerably smaller than the weight of the rigid structure 4 of FIGS. 1 to 3. Nevertheless, the buoyancy elements 4-4a and 4-4b remain relatively more expensive than a construction in the form of a metal lattice structure.

Thus, the choice between a solution of the rigid structure type 4 as described with reference to FIG. 1, or a solution of the hinged type as described with reference to FIG. 4, depends essentially on the available means and on the costs involved in prefabrication, transport, and installation: building, transporting, and installing unit structures weighing several thousands of tonnes requires means that are considerable and specific, and that are not always available in certain regions of the world.

In the hinged configuration of FIG. 4, when the platform 2 moves, as shown in FIG. 2, since the elements 4-1, 4-2a, and 4-2b are hinged to one another, they end up moving in the same direction as said platform 2 but in highly attenuated manner, which implies that the second catenary portions 1-2 deform in the same direction as the first catenary portions 1-1, with the points of contact 1-2a and 1-2b moving in the same direction, i.e. in the opposite direction to the platform 2 and the top portion 4-2. Thus, each of the variants of the rigid support structure 4 of the invention presents advantages and drawbacks compared with the other.

In FIG. 4, there can be seen an installation ship 10 on the surface 12 that is fitted with an undersea remotely operated vehicle (ROV) 11 in the proximity of the troughs supporting the flexible pipes. The levels of the top and bottom troughs 3a and 3b are advantageously arranged so as to be spaced apart vertically a height h0 lying in the range 10 m to 20 m so that said ROV 11 can pass between the two levels of troughs without interfering with the flexible pipes in order to take action, should that be necessary.

Figure 5B:
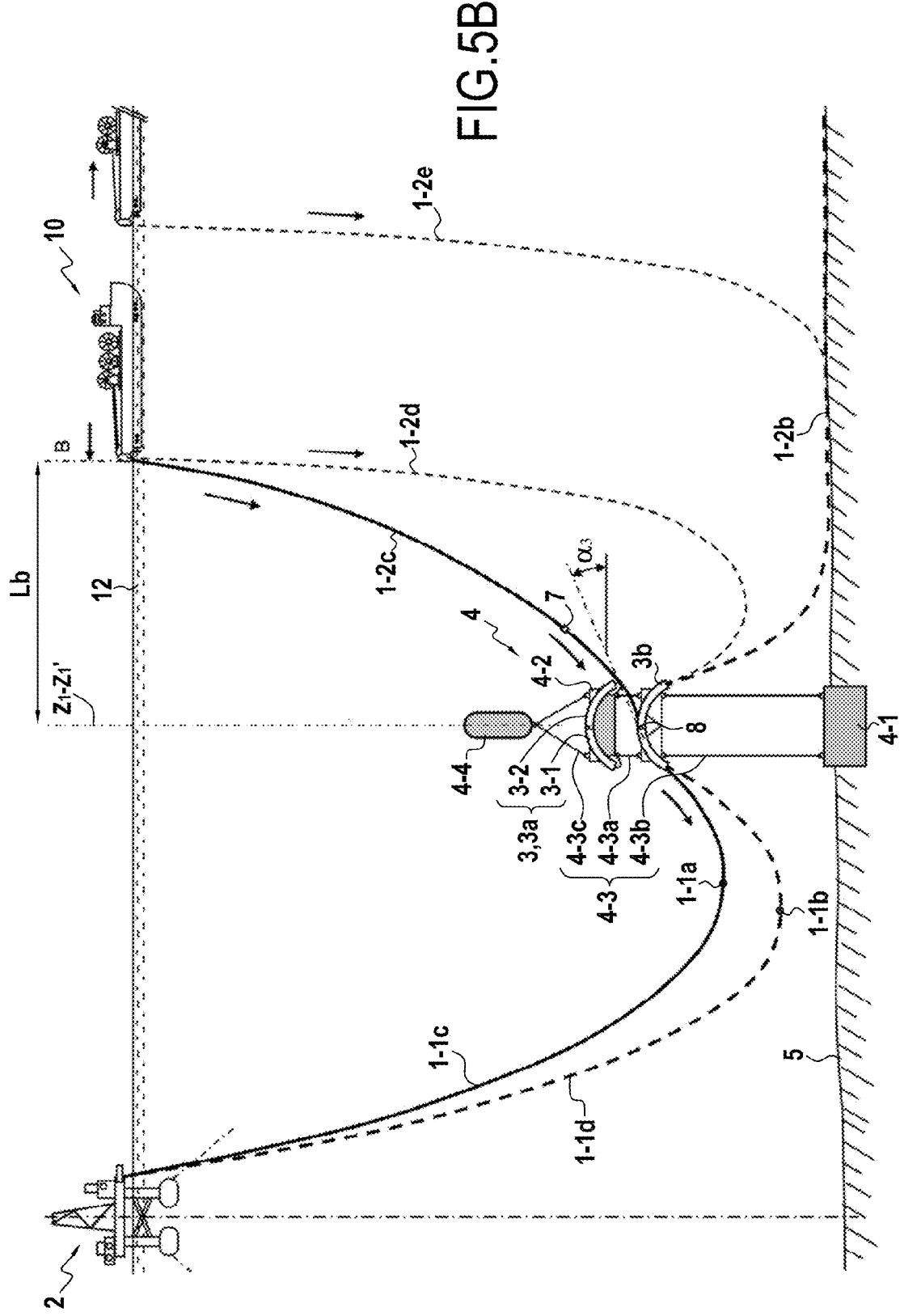
FIG. 5B is a side view showing the second, third, and fourth steps in installing a said flexible pipe on the bottom trough 3b.

FIGS. 5A and 5B are side views showing a flexible pipe being installed on a bottom trough 3b. In FIG. 5a, the installation ship 10 takes up a position at a distance La from the vertical axis Z1Z1' of the support structure 4 and then transfers the flexible pipe in known manner to the platform 2 by passing between the top troughs 3a and the bottom troughs 3b.

In summary, the end 14 of the flexible pipe 1 is connected at 2b to the side of the platform 2 by performing the following steps:

step 1: a cable 13 is suspended vertically from the laying ship 10, which ship is located close to the axis Z1Z1' of the support structure 4 at a short distance La;

step 2: the ROV 11 takes hold of the bottom end of the cable 13 and passes it between the two troughs 3a and 3b so as to be able to attach it to the platform 2 at 2b;

step 3: where appropriate, the cable 13 is replaced by a stronger traction cable;

step 4: the ship is positioned at the distance La from the axis Z1Z1' and the end 14 of a flexible pipe stored on board the ship 10 is attached to the free end of the cable 13; and step 5: the end 14 of the pipe 1 is transferred to the floating support 2 and is attached to a side at 2b.

Once the end 14 of the flexible pipe is securely attached to the platform 2, the installation ship 10 approaches the axis Z1Z1' to occupy a distance Lb<La as shown in detail in FIG. 5B. The flexible pipe is then in a configuration 1-1c and 1-2c in which the downstream top portion 1-2c comes into abutment against a deflector 9 at the end of the front portion 3-2 of the top trough 3a. Only the rear portion 3-1 of the bottom trough 3b supports the flexible pipe 1, the bottom end of the portion 1-2c of the pipe 1 not resting on the front portion 3-2 of the bottom trough 3b.

As shown in FIGS. 6A to 6D, the two portions 3-1 and 3-2 of a trough 3 present internal channels of different cross-sectional widths, the portion 3-1 of the trough presenting an internal channel 3-4 of smaller width than that of the cross-section of the internal channel 3-4 in the second trough portion 3-2 arranged at the end of the trough that is further from the floating support 2.

The greater width internal channel 3-4 of the second trough portion 3-2 is suitable for containing a flexible pipe surrounded by a ring 7, while the internal channel 3-4 of the first trough portion 3-1 is suitable for containing the flexible pipe 1 and cannot contain the pipe when surrounded by said ring 7. The ring 7 is thus retained by a shoulder 3-3 in the zone where there is a discontinuous change of width between the two portions 3-1 and 3-2.

Figure 7B:
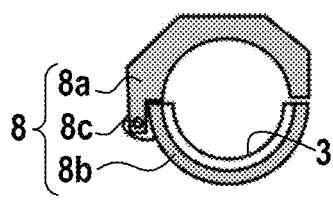
FIG. 7A is a vertical cross-section view of the pipe 1 with two semi-tubular portions 7a and 7b forming said ring 7 once pressed against the pipe 1 and the keeper 8 in the open position, with FIG. 7B showing the keeper 8 in its closed position (in the absence of pipes and the ring 7 inside it)
Figure 7A:
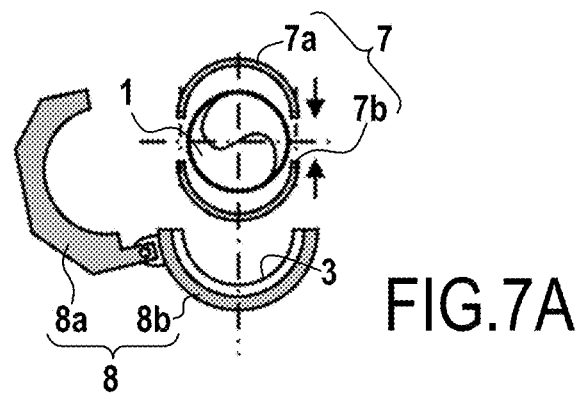

By way of example, the ring 7 is made up of two semi-tubular half-shells 7a and 7b that are assembled together by bolts so as to come into abutment against the pipe 1 at a predetermined position relative to its end 14, as shown in FIG. 7A.

While laying the pipe 1 at the stage shown in FIG. 5B, the ring 7 is close to the end of the deflector 9 on the front portion 3-2 of the top trough 3 in contact with the pipe portion 1-2c.

Because of the difference in height h0 between the top trough 3a and the bottom trough 3b, an angle $\alpha_3$ of at least 30° and preferably equal to about 45° is conserved relative to the horizontal for the segment between the point of contact of the pipe 1-2c with the deflector 9 at the end of the portion 3-2 of the top trough 3a and the top of the bottom trough 3b corresponding to the shoulder 3-3 between the portions 3-1 and 3-2 of the bottom trough 3b. This angle $\alpha_3$ makes it possible to avoid excessively curving the pipe portion 1-2c, and the presence of the deflectors avoids damaging the flexible pipe even in the event of contact that is insistent.

Figure 6A:
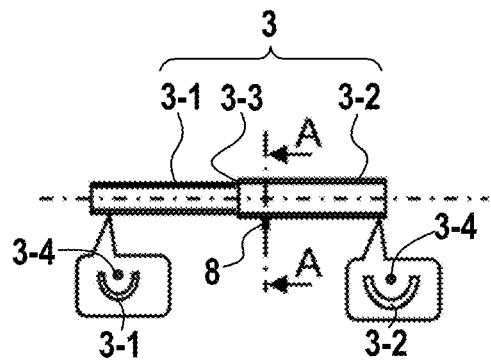
FIG. 6A is a plan view of a trough 3 showing in detail the respective cross-sections of a front portion 3-1 and of a rear portion 3-2 of the trough that presents internal channels 3-4 of different diameters, and thus of different widths.
Figure 6B:
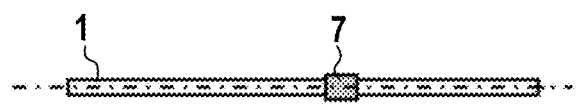
FIG. 6B is a plan view of a flexible pipe fitted with a separate ring 7 for holding said flexible pipe within said trough of FIG. 6A.
Figure 6C:
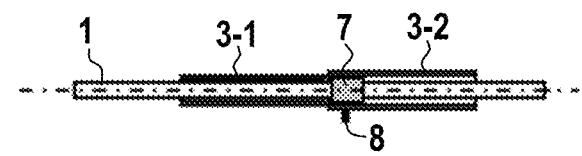
FIG. 6C is a plan view of the flexible pipe of FIG. 6B installed in the trough of FIG. 6A, a keeper 8 being in an open position.

As shown in FIG. 5B, when the ship 10 continues to unreel the flexible pipe, because it is located at the distance Lb from the axis Z1Z1', i.e. is closer to the axis of the structure 4, said flexible pipe lies naturally over the bottom trough 3b, mainly on its left-hand portion 3-1, and the ring 7 then comes into abutment at 3-3 against the diameter transition between the left-hand and right-hand portions 3-1 and 3-2 of the trough, in the configuration shown in FIG. 6C.

When the pipe portion 1-2c continues to be lowered, the ring 7 approaches the shoulder 3-3 until it becomes blocked by being retained thereagainst.

In this position, the flexible pipe 1 going towards the platform 2 is in its final configuration 1-1d and moves very little thereafter. The ship 10 then continues to unreel the flexible pipe 1 so that the downstream pipe portion adopts the configuration 1-2d. The ship then continues to advance so as to adjust the point of contact 1-2b with the sea bottom 5 so that it is substantially at a distance R1 from the axis Z1Z1'. Finally, the ship 10 continues in conventional manner with ordinary laying of the pipe in a configuration 1-2e towards the well heads (not shown).

FIG. 6B is a plan view of the flexible pipe 1 fitted with its blocking ring 7.

FIG. 6C is a plan view of the flexible pipe 1 fitted with its blocking ring 7 in its position in abutment against the transition zone 3-3 of the trough 3, a keeper 8 being in an open position.

Figure 6D:
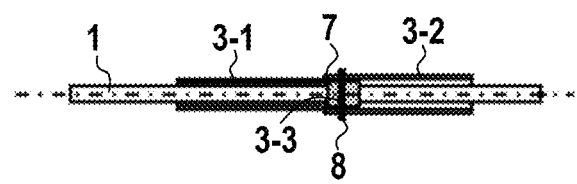
FIG. 6D is a plan view light FIG. 6C showing the locking keeper 8 of the separate ring 7 in its closed position.

In FIG. 6D, the keeper 8 is actuated by the ROV 11, thereby preventing any further movement of the flexible pipe 1, both upwards and also to the right relative to the trough 3.

In order to avoid damaging the flexible pipe while it is being installed on a bottom trough 3b, the top troughs 3a are fitted with deflectors 9 as mentioned above, which deflectors present an outer profile that is suitable for avoiding inflicting damage to a flexible pipe portion that may come into contact with said deflector while the pipe is being laid. A deflector is advantageously present at each of the ends of the two portions 3-1 and 3-2. The deflector at the end of the portion 3-1 is useful more particularly during the initial stage of transferring the end 14 of the pipe towards the platform 2 and of attaching it to said platform at 2b.

FIGS. 7A and 7B show a keeper 8 in detail, which keeper comprises two semi-tubular portions 8a and 8b that are hinged together by a hinge 8c, the bottom portion 8b being secured to the trough 3 and the top portion 8a being suitable for pivoting so as to press down against the top face of the ring 7 once it is in place at the transition of the retaining and blocking position 3-3.

For clarity in the figures, the troughs are shown as truncated torus portions presenting a circular cross-section of diameter that is slightly greater than the diameter of the flexible pipe (trough portion 3-1) or of the ring (trough portion 3-2), but the arch shape in the plane XX' could equally well be of elliptical, parabolic, or any other shape of varying curvature with its greatest curvature being less than the limiting critical curvature of said flexible pipe. Likewise, the cross-section of the trough may be of any shape, e.g. it may be U-shaped, it being understood that the inside width of the U-shape in the trough portion 3-1 is slightly greater than the diameter of the flexible pipe, and that the inside width of the U-shape in the trough portion 3-2 is slightly greater than the diameter of the ring. As a result, the flexible pipe is properly guided between the walls of the U-shape, and the ring naturally becomes blocked at the zone where the width of the U-shape of the trough changes, as explained above.

The radii of curvature of the various troughs are shown in the figures as being identical, however it is advantageous to have radii of curvature that are adapted to each of the pipes, thereby minimizing the weight of the assembly and thus reducing the amount of buoyancy required, more particularly for the variants of the device described with reference to FIGS. 4, 5A, and 5B.

In the floating and hinged version described with reference to FIG. 4, the single catenaries 1-2a and 1-2b deform significantly when the floating support moves as a result of swell, wind, and currents, and it is therefore important for the radii R1 and R2, and also for the radii R3 and R4 to be very different, with R2>R1 and R4>R3 so as to avoid any contact between the flexible pipes supported respectively by the troughs 3a and by the troughs 3b. In contrast, for a fixed structure 4, as described with reference to FIGS. 1, 2, and 3, the single catenary portions 1-2a and 1-2b remain substantially stationary regardless of the movements of the floating support as a result of swell, wind, and currents: the values for the radii R1-R2 and R3-R4 are then no longer very critical, but it may nevertheless be preferred, e.g. for reasons of future inspections by ROV, to arrange the pipe as described in the invention in such a manner as to avoid any possibility of confusing flexible pipes coming from the top troughs with flexible pipes coming from the bottom troughs, it being understood that the flexible pipes leave the sea bottom going towards their respective troughs that are situated 100 m to 200 m higher up, and that visibility at great depths is limited to a few meters, or at best to a few tens of meters.

The invention claimed is:

1. A bottom-to-surface connection installation between a common floating support and the sea bottom, the installation comprising a plurality of flexible lines comprising flexible pipes made in whole or part of tubular thermoplastic layer reinforced with spiral-wound strips made of steel or composite material, said flexible lines extending between said floating support and the sea bottom where the flexible lines are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, the installation having at least one trough support structure comprising a bottom portion forming a base resting on and/or anchored to or embedded in the sea bottom and a top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough.

2. The bottom-to-surface connection installation according to claim 1, wherein the point of contact with the sea floor of the flexible line passing via the bottom trough is closer to said base than is the point of contact with the sea floor of the flexible line passing via the top trough.

3. The bottom-to-surface connection installation according to claim 1, wherein said top portion of said trough support structure comprises at least two rigid support elements, respectively a bottom element and a top element, arranged at different heights and each supporting a plurality of troughs that are laterally offset in a direction in a vertical plane perpendicular to the vertical axial plane of said support structure and of said rigid support elements and/or perpendicular to the vertical longitudinal axial planes of said troughs, which are parallel to one another.

4. The bottom-to-surface connection installation according to claim 3, wherein said troughs are arranged symmetrically relative to a vertical axial plane of said support structure and of said rigid support elements.

5. The bottom-to-surface connection installation according to claim 1, including at least two of said trough support structures with said vertical axial planes being disposed angularly at an angle $\alpha$.

6. The bottom-to-surface connection installation according to claim 1, wherein the two second flexible line portions of two flexible lines pass via two adjacent troughs supported by a common rigid support element, the troughs being laterally offset and arranged angularly relative to each other at an angle $\alpha_2$ that is greater than the angle $\alpha_1$ of the two first portions of the flexible lines of the same two flexible lines.

7. The bottom-to-surface connection installation according to claim 1, wherein said rigid support elements for troughs form horizontal beams.

8. The bottom-to-surface connection installation according to claim 1, wherein the troughs supported by a common rigid support element are arranged at different heights.

9. The bottom-to-surface connection installation according to claim 1, wherein the low points of two first flexible line portions passing via adjacent troughs supported by a common rigid support element are at different heights.

10. The bottom-to-surface connection installation according to claim 1, wherein said top trough element or the ends of the troughs that it supports include(s) a deflector of profile suitable for avoiding damaging any portion of flexible pipe that might come into contact with said deflector while the pipe is being laid on a said bottom trough.

11. The bottom-to-surface connection installation according to claim 1, wherein said top trough is at a height above the closest bottom trough such that the segment passing via the longitudinal end of the top trough and the top of the bottom of the bottom trough forms an angle $\alpha_3$ of at least 30° relative to the horizontal.

12. The bottom-to-surface connection installation according to claim 1, wherein said top portion of the trough support structure is other than a float and/or is not rigidly attached to a float.

13. A bottom-to-surface connection installation between a common floating support and the sea bottom, the installation comprising a plurality of flexible lines comprising flexible pipes between said floating support and the sea bottom where the flexible lines are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, the installation having at least one trough support structure comprising a bottom portion forming a base resting on and/or anchored to or embedded in the sea bottom and a top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough, wherein said flexible pipe is held in said trough by a retaining member.

14. The bottom-to-surface connection installation according to claim 13, wherein said retaining member comprises a tubular device forming a ring that is prepositioned around said pipe at a predetermined distance from the end of the pipe that is fastened to the floating support, said ring being suitable for being blocked and/or locked in said at least one trough, said at least one trough including a first portion of an internal channel containing or suitable for containing said flexible pipe but not capable of containing said pipe surrounded by said ring, said first trough portion being situated at the end of the trough that is closer to the floating support, the cross-sectional width of the internal channel of said first trough portion being smaller than the cross-sectional width of the internal channel of a second trough portion arranged at the end of the trough that is further from the floating support, the internal channel of said second trough portion containing or being suitable for containing a said flexible pipe surrounded by said ring, said ring being retained by a shoulder at the zone where the width varies between the two internal channels of the first and second trough portions.

15. A bottom-to-surface connection installation between a common floating support and the sea bottom, the installation comprising a plurality of flexible lines comprising flexible pipes between said floating support and the sea bottom where the flexible pipes are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, the installation having at least one trough support structure comprising a bottom portion forming a base resting on and/or anchored to or embedded in the sea bottom and a top portion comprising a rigid tower vertically extending from said base and rigidly secured to said base, said top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough, wherein said trough support structure is a rigid structure comprising a rigid tower rising above a said base resting on and/or anchored to the sea bottom to which it is rigidly secured.

16. A bottom-to-surface connection installation between a common floating support and the sea bottom, the installation comprising a plurality of flexible lines comprising flexible pipes between said floating support and the sea bottom where the flexible lines are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, the installation having at least one trough support structure comprising a bottom portion forming a base resting on and/or anchored to or embedded in the sea bottom and a top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough, wherein said trough support structure is a rigid structure comprising a rigid tower rising above a said base resting on and/or anchored to the sea bottom to which the base is rigidly secured, and wherein said base is a metal lattice structure extending horizontally and resting on the sea bottom, and said rigid tower is a metal lattice structure rising vertically and supporting at least two rigid support elements, a top support element and a bottom support element forming beams that extend on either side of the tower along at least two vertical levels, said troughs being fastened on top of the beams, said tower being fastened to said metal lattice structure of said base by sloping rigid connection and reinforcing elements.

17. A bottom-to-surface connection installation between a common floating support and the sea bottom, the installation comprising a plurality of flexible lines comprising flexible pipes between said floating support and the sea bottom where the flexible lines are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, the installation having at least one trough support structure comprising a bottom portion forming a base resting on and/or anchored to or embedded in the sea bottom and a top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough, wherein said trough support structure is a hinged structure comprising at least two rigid support elements, a top element and a bottom element, forming beams arranged one above the other and connected together by first flexible connection elements, said bottom trough support element being connected to said base by second flexible connection elements, said first flexible connection elements comprising first stays, and said second flexible connection elements comprising second stays, said top element and said bottom element being held one above the other and above said base by at least one submerged buoyancy element fastened to at least one said top element suitable for tensioning said first and second stays.

18. The bottom-to-surface connection installation according to claim 17, wherein said top rigid support element is suspended from a submerged top float to which it is connected by third flexible connection elements, and said top rigid support element is supported by a bottom float on which it is fastened.

19. A bottom-to-surface connection installation between a common floating support and the sea bottom, the installation comprising a plurality of flexible lines comprising flexible pipes between said floating support and the sea bottom where the flexible lines are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, such that only one instance of a double catenary portion precedes the single catenary portion between each trough and the floating support, the installation having at least one trough support structure comprising a bottom portion forming a base resting on and/or anchored to or embedded in the sea bottom and a top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough.

20. A bottom-to-surface connection installation between a common floating support and the sea bottom, the installation comprising a plurality of flexible lines comprising flexible pipes between said floating support and the sea bottom where the flexible lines are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, the installation having at least one trough support structure comprising a bottom portion forming a base resting on and/or anchored to or embedded in the sea bottom and a top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough, and wherein the point of contact with the sea floor of the flexible line passing via the bottom trough is closer to said base than is the point of contact with the sea floor of the flexible line passing via the top trough.

21. A bottom-to-surface connection installation between a common floating support and the sea bottom, the installation comprising a plurality of flexible lines comprising flexible pipes between said floating support and the sea bottom where the flexible lines are connected to well heads, pieces of equipment, or the ends of undersea pipes resting on the sea bottom of said installation, said flexible lines being supported respectively by a plurality of support and guide elements of arch shape referred to as troughs, each trough lying between two pipe portions comprising a first flexible line portion in a double hanging catenary configuration between the floating support and said trough, and a second flexible line portion in a single catenary configuration between said trough and a point of contact between said flexible pipe and the sea bottom, the installation having at least one trough support structure comprising a bottom portion forming a base resting on and/or anchored to or embedded in the sea bottom and a top portion supporting at least two troughs comprising a bottom trough and a top trough arranged at different heights such that the low point of the hanging double catenary of the first flexible line portion passing via the bottom trough is situated below the low point of the hanging double catenary of said first flexible line portion passing via the top trough, wherein said top portion of the trough support structure is other than a float and/or is not rigidly attached to a float.

* * * * *